(12) United States Patent
Zbiral et al.

(10) Patent No.: US 11,125,371 B2
(45) Date of Patent: Sep. 21, 2021

(54) COUPLING DEVICE FOR MEDIA-CONDUCTING LINES

(71) Applicant: MANN+HUMMEL GmbH, Ludwigsburg (DE)

(72) Inventors: Robert Zbiral, Marbach (DE); Thomas Jessberger, Asperg (DE); Andreas Weber, Freiberg (DE); Timo Dirnberger, Marbach (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 799 days.

(21) Appl. No.: 15/815,220

(22) Filed: Nov. 16, 2017

(65) Prior Publication Data

US 2018/0142823 A1 May 24, 2018

(30) Foreign Application Priority Data

Nov. 18, 2016 (DE) ...................... 10 2016 013 752.5

(51) Int. Cl.
*F16L 37/12* (2006.01)
*F16L 37/088* (2006.01)
*F16L 37/14* (2006.01)

(52) U.S. Cl.
CPC ......... *F16L 37/123* (2013.01); *F16L 37/0885* (2019.08); *F16L 37/144* (2013.01)

(58) Field of Classification Search
CPC ... F16L 37/123; F16L 37/0885; F16L 37/144; F16L 37/12
See application file for complete search history.

(56) References Cited

U.S. PATENT DOCUMENTS

| | | | | |
|---|---|---|---|---|
| 3,929,357 A | * | 12/1975 | DeVincent | F16L 37/0885 285/319 |
| 3,948,548 A | * | 4/1976 | Voss | F16L 37/0885 285/321 |
| 4,226,445 A | * | 10/1980 | Kramer | F16L 37/0885 285/39 |
| 4,244,608 A | * | 1/1981 | Stuemky | F16L 37/144 24/545 |
| 5,273,323 A | * | 12/1993 | Calmettes | F16L 33/227 285/321 |
| 2012/0280489 A1 | | 11/2012 | Bundy et al. | |

FOREIGN PATENT DOCUMENTS

| | | | | |
|---|---|---|---|---|
| DE | 2444993 A1 | | 4/1976 | |
| DE | 10047509 A1 | * | 4/2001 | ............ F16L 37/144 |
| DE | 102010035027 A1 | | 2/2012 | |
| EP | 0719971 A1 | * | 7/1996 | .......... F16L 37/0885 |
| WO | WO-2012003557 A1 | * | 1/2012 | .......... F16L 37/0885 |

* cited by examiner

*Primary Examiner* — James M Hewitt, II
(74) *Attorney, Agent, or Firm* — James Hasselbeck

(57) ABSTRACT

A coupling device for connecting media-conducting lines has a one-part or multi-part first coupling section and a one-part or multi-part second coupling section. At least one locking element is fastened with at least one connecting section to the first coupling section and is provided with one or more locking arc sections extending in a circumferential direction between the first and second coupling sections. The second coupling section has a locking section extending circumferentially at least partially about a circumference of the second coupling section. At least one of the one or more locking arc sections interacts with the locking section.

6 Claims, 12 Drawing Sheets

COUPLING DEVICE FOR MEDIA-CONDUCTING LINES

BACKGROUND OF THE INVENTION

The invention concerns a coupling device for connecting media-conducting lines, in particular for producing a quasi-rigid connection of media-conducting lines.

EP 2 501 979 B1 discloses a quick coupling for ducts in the form of a connecting device for a plug-in section, comprising an annular outer groove, of a hose-shaped or tubular line or of a socket. The connecting device comprises a housing into which the plug-in section can be inserted. The connecting device comprises also a locking element with which the plug-in section inserted into the housing can be locked on the housing. The anti-slide securing device of the locking element is realized in the pull-out direction externally on the housing. For this purpose, a securing device is proposed that is externally arranged on the housing. By arranging such a securing device externally on the housing, a simplified accessibility is provided. The securing device comprises an outer stop arranged externally on the housing which is positioned in the preassembled state opposite an externally positioned end of the locking element in the pull-out direction. Such an outer stop effects a securing action against displacement of the locking element in the pull-out direction.

SUMMARY OF THE INVENTION

It is an object of the invention to provide an inexpensive and easily mountable coupling device that is in particular suitable for quasi rigid media-conducting lines.

The aforementioned object is solved with a coupling device, with an outer coupling section and an inner coupling section as well as at least one locking element that is fastened with at least one connecting section to one of the coupling sections and is extending with one or a plurality of locking arc sections in circumferential direction between the two coupling sections.

Beneficial configurations and advantages of the invention result from the further claims, the description, and the drawing.

A coupling device for connecting media-conducting lines is proposed, with a one-part or multi-part outer coupling section and a one-part or multi-part inner coupling section as well as at least one locking element that, by means of at least one connecting section is fastened to one of the coupling sections and extends with one or a plurality of locking arc sections in circumferential direction between the two coupling sections. At least one of the locking arc sections interacts with a corresponding locking section that is extending circumferentially at least partially on the circumference of the other one of the coupling sections.

Optionally, two, three or more locking elements can be provided. Each one of the locking elements can be fastened with at least one connecting section to one of the coupling sections. The at least one locking element can be symmetrical or unsymmetrical relative to its at least one connecting section or to its plurality of connecting sections.

The individual components of the coupling device, such as coupling sections and locking element, can be embodied of synthetic material, in particular of a glass fiber filled synthetic material. In particular, for example, polyamide (PA) with different glass fiber proportions can be employed, for example, PA GF30, PA GF50 or PA GF60, i.e., with 30%, 50%, or 60% glass fiber proportions, depending on the desired strength. Alternatively, it is also possible to employ, for example, an inner coupling section which is made of metal. The coupling sections can be embodied as circumferentially closed one-part components but can also be embodied at the circumference in multiple parts, approximately shell-like.

The coupling arrangement according to the invention is particularly suitable for producing a rigid or quasi rigid connection, for example, in case of charge air lines in motor vehicles or connections, in particular with high temperature and pressure loading of the connection. The coupling arrangement can compensate easily the movements produced during installation or by slight positional changes between connecting points.

In particular, when providing two coupling sections, for example, in a duct, it is possible to compensate movements between connecting elements in case of rigid connections with only minimal deviations. The coupling sections can be end sections of two ducts that are to be connected to each other.

The coupling device according to the invention comprises at least one locking element that is arranged, for example, on the outer coupling section, which comprises one or a plurality of locking arc sections which extend in circumferential direction about the inner coupling section. For example, to both sides of a connecting section arranged on the coupling section, one locking arc section of the locking element can be extending. When the inner coupling section is inserted into the outer coupling section, the two locking arc sections are expanded outwardly and, upon further insertion of the inner coupling section, can lock in at least one partially circumferentially extending locking section of the inner coupling section. In this way, the coupling device is locked and the inner coupling section can no longer be pulled out of the outer coupling section simply by pulling.

For this purpose, the locking arc sections are elastic but bending resistant so that they can be reversibly expanded and, without pressure being applied onto a possible actuation element, can snap back into their initial position. In this way, a simple locking mechanism without additional separate locking elements can be realized. The locking element can also be designed without separate spring. The coupling device cannot be detached by only pulling in axial direction or by tilting the coupling sections relative to each other, The locking element is connected by the connecting section to the coupling section and can be produced together with it and/or can even be comprised of the same material. Locking element and coupling section can be formed as one piece. Alternatively, it is however also possible to produce the locking element by an injection molding process together with the coupling section. The locking element can be comprised of a different material than the coupling section. In particular, the locking element can be produced by a two-component process together with the coupling section and both can be comprised of different materials. For a stable connection, it can be sufficient when the locking arc sections engage only about a portion of the circumference of the inner coupling section.

The coupling device can advantageously be embodied to be compatible with a VDA standard coupling for pipe connections (VDA: abbreviation for Verband der Automobilindustrie; German Association of the Automotive Industry).

The locking element can be arranged with its locking arc sections on the outer coupling section and can glide across the inner coupling section and lock at its locking section. Alternatively, the locking element can be arranged on the inner coupling section and can be inserted into the outer coupling section by compression and then lock in a locking section of the outer coupling section in that, due to its elastic properties, it can expand again upon reaching the shoulder of the locking section. In this way, a safe locking action of the coupling device can be achieved also.

According to a further advantageous embodiment, at least one actuating element for opening the locking arc sections can be provided on the locking element. Then the locking element can be easily opened from the exterior. By force introduction into the actuation element which is arranged on the locking arc section, the locking arc section can be expanded in the circumferential direction without additional tool so that the locking arc section can be released from the locking section and the inner coupling section can be pulled out again from the outer coupling section again.

According to a further advantageous embodiment, the locking element can be integrally formed on one of the coupling sections. Coupling section and locking element can be expediently embodied together as one piece so that they can be produced together, for example, by an injection molding process. For this purpose, the locking element can be integrally formed by means of the connecting section to the coupling section in order to be able to produce both elements in an injection mold. Coupling section and locking element can be comprised of the same or of different materials. In this way, the coupling device can be produced cost-efficiently. Also, the locking element is connected captively and stably in this way with the coupling element. It is particularly advantageous that the at least one locking element is always in correct position at the correct location. This avoids errors during assembly which is thereby made simpler and more reliable.

According to an advantageous embodiment, the locking element for proper assembly can be reversibly expanded in diameter by the inner coupling section. In this way, the inner coupling section can be inserted easily into the outer coupling section. Due to its elastic spring action, the locking element with its locking arc sections can snap into place in the locking section arranged at the inner coupling section and thereby lock the two coupling sections with each other. In this way, the coupling device is closed. In order to release the coupling device again, the locking element can be expanded again and the inner coupling section can be pulled out of the outer coupling section again. Since the locking element is reversibly expandable, it can equally perform its function upon the next insertion of an inner coupling section.

According to an advantageous embodiment, the actuating element can project through an opening in the outer one of the coupling sections. The actuating element can therefore have a greater length and thus a greater leverage so that upon expanding of the locking arc section more force, and distributed better, can be applied and the coupling device can be released more easily in this way. Also, the position of the locking element can be visually detected by means of the actuating element and it can thus be evaluated whether the locking element has indeed locked effectively in the locking section.

According to an advantageous embodiment, the actuating element can have a support region in circumferential direction. Support regions in circumferential direction, which upon closing of the locking element on the outer coupling section on which the locking element is arranged, can expediently effect an additional stabilization and stiffening of the actuating element for applying greater forces on the locking arc sections when opening the coupling device. Particularly advantageous is also an enlargement of the contact surface of the support region between the coupling sections so that greater forces can be transmitted.

According to an advantageous embodiment, the actuating element can be arranged adjacent to a free end of the locking arc section. In this way, when applying a force on the actuating element in order to expand the locking arc section and thereby release the coupling device, a greater leverage can be utilized so that the release process can be performed more easily. The locking arc section can thus be released more easily from the locking section with which it is locked.

According to an advantageous embodiment, the locking section can be embodied as a circumferential, radial inwardly oriented shoulder against the pull-out direction of the coupling section, wherein the locking arc section in the properly mounted state is contacting the locking section and is supported against the pull-out direction. In this way, the locking arc section, when the inner coupling section is inserted into the outer coupling section, can glide in the expanded state across the rim of the locking section and then, when it has passed the shoulder, can snap into place and in this way lock the inner coupling section. In this way, a simple release of the coupling device by axially pulling the inner coupling section out of the outer coupling section is not possible; instead, the locking element must first be expanded again.

According to an advantageous embodiment, the locking element can be produced as one piece together with one of the coupling sections. In this way, a simple and cost-efficient manufacture of the outer coupling section with locking element of the coupling device, for example, by injection molding in a common tool, is possible.

According to an advantageous embodiment, the locking element can be produced with one of the coupling sections in an injection molding process. Alternatively, it is also possible to manufacture coupling section and locking element in an injection molding process with different materials. For example, the coupling section can be produced of a stronger material while the locking element exhibits a greater elasticity and bending stiffness.

According to an advantageous embodiment, the locking element can be produced in a two-component injection molding process together with one of the coupling sections but can be comprised of a different material than the coupling section. For example, the coupling section can be produced of a stronger material while the locking element exhibits a greater elasticity and bending stiffness.

According to an advantageous embodiment, at least two orientation elements can be provided by means of which the coupling sections can be mounted in correct position in an angular position relative to the longitudinal axis. The two coupling sections can be mounted with orientation in this way. The orientation elements can be embodied, for example, as nose on a coupling section and as an associated slit at the other coupling section. The orientation elements can advantageously also serve as an anti-rotation device.

According to an advantageous embodiment, at least one coupling section can have at least one marking for recognizing a locking action of the locking element in the locking section by means of a position of the at least one actuating element. The position of the actuating elements enable recognition of the state of the locking action of the locking element in the locking section. Therefore, it is possible in a simple way to evaluate, for example, by means of the markings which correlate with the position of the actuating elements, the state of the coupling device. In this way, a reliable conclusion in regard to the state of the locking action is possible without having to load the coupling device by a pulling action.

According to an advantageous embodiment, on at least one of the coupling sections a sealing groove can be provided which, on the circumference of the corresponding coupling section, is at least partially embodied in a corrugated shape in the assembly direction. This makes it possible, when the seal is inserted, in particular in assembly direction, and brought into a corresponding corrugated shape due to the receiving geometry of the sealing groove, to provide an advantageous reduction of the assembly force for producing the connection between the coupling sections.

According to a further aspect of the invention, the use of the coupling device is proposed for producing a quasi rigid connection of media-conducting lines, in particular low-pressure and/or high-pressure lines in an air intake system, or media-conducting housings with connecting sockets and lines. For assembly, an axis-precise installation is not required. The coupling device can easily compensate movements produced during installation or by slight positional changes between connecting points. Also, in a simple way a safe and reliable connection between two coupling sections can be thus produced which can be released in likewise simple manner without tools.

According to a further aspect of the invention, a coupling section for a coupling device is proposed with a locking element that comprises at least one locking arc section which is matched at least partially to the circumference of the coupling section and, in mounted state, is interacting as intended with a corresponding locking section extending circumferentially at least partially about the circumference of another coupling section such that in the mounted state of the coupling sections an axial movement between the coupling sections can be limited. The coupling section can be part of a duct which is to be connected by means of the coupling device with another duct.

Advantageously, handling can be simplified by at least one actuating element which is provided on the locking element for opening the locking arc sections.

According to an advantageous configuration, the locking element can be reversibly expandable in diameter for proper mounting. Since the locking element is reversibly expandable, it can equally perform its function for the next insertion of an inner coupling section. The coupling section with locking element can thus be reused several times.

According to a further aspect of the invention, a coupling section for a coupling device is proposed with a locking section that extends circumferentially at least partially about the circumference of the coupling section and is properly interacting in the mounted state with a corresponding locking arc section of a locking element that is at least partially matched to the circumference of another coupling section in such a way that an axial movement between the coupling sections can be limited. The coupling section can be part of a duct which is to be connected by means of the coupling arrangement with another duct. Also, in a simple way a safe and reliable connection between two coupling sections can be produced which can be released again in a likewise simple way without tools.

According to an advantageous configuration, the locking section can be embodied as a circumferential, radial inwardly oriented shoulder against the pull-out direction of the coupling section wherein the locking arc section for proper mounting is resting on the locking section and is supported against the pull-out direction. In this way, a simple release of the coupling device by axially pulling the inner coupling section out of the outer coupling section is not possible. Instead, for releasing the coupling device, the locking element must first be expanded again. Only thereafter, the inner coupling section can be pulled out of the outer coupling section.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will consider the features expediently also individually and combine them to other meaningful combinations.

DESCRIPTION OF PREFERRED EMBODIMENTS

Figure 1:
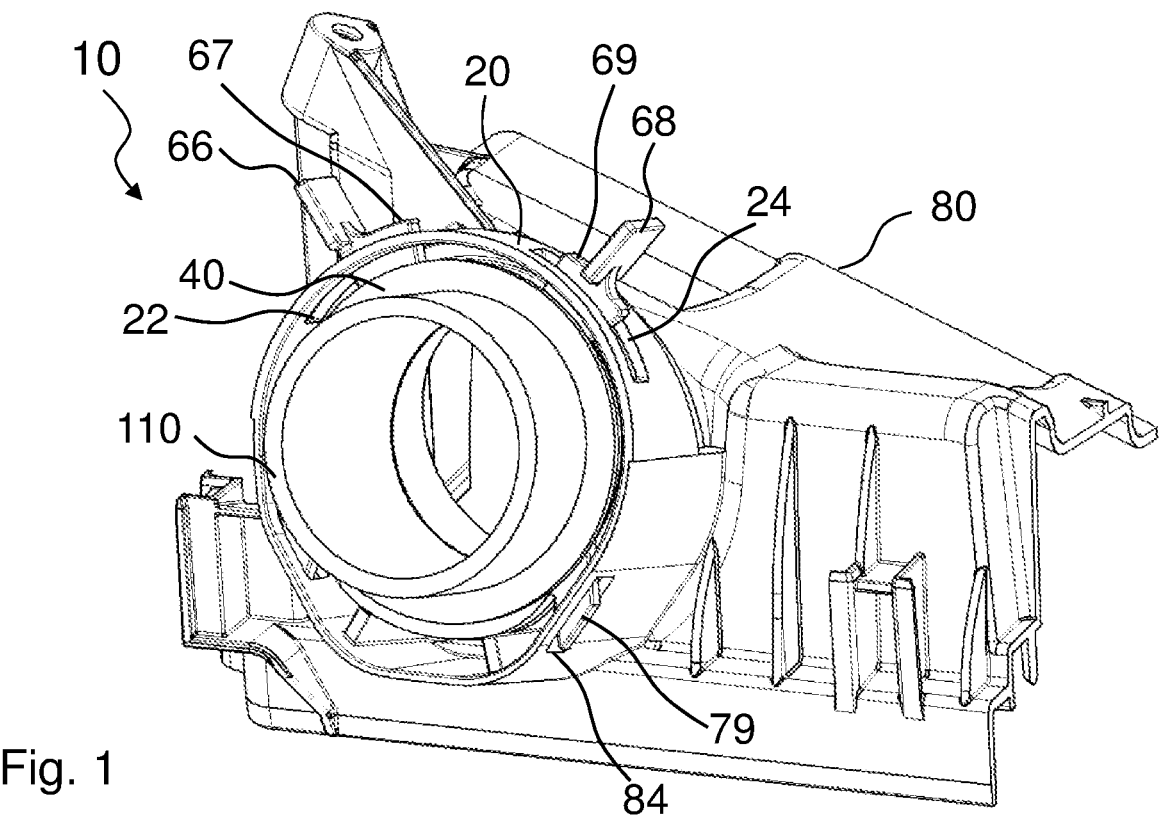
FIG. 1 shows an isometric view of a coupling device according to an embodiment of the invention.

In the figures, same or same-type components are identified with same reference characters. The Figures show only examples and are not to be understood as limiting.

Figure 2:
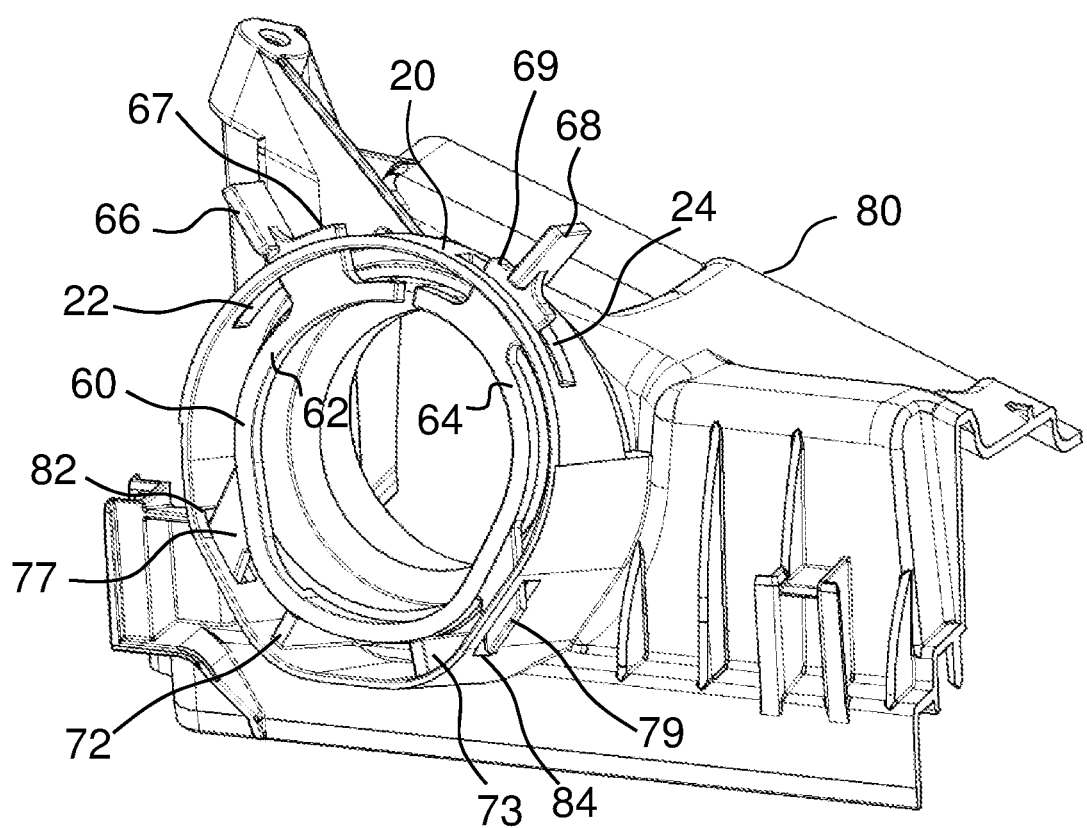
FIG. 2 shows an isometric view of the outer coupling section of the coupling device according to FIG. 1.
Figure 3:
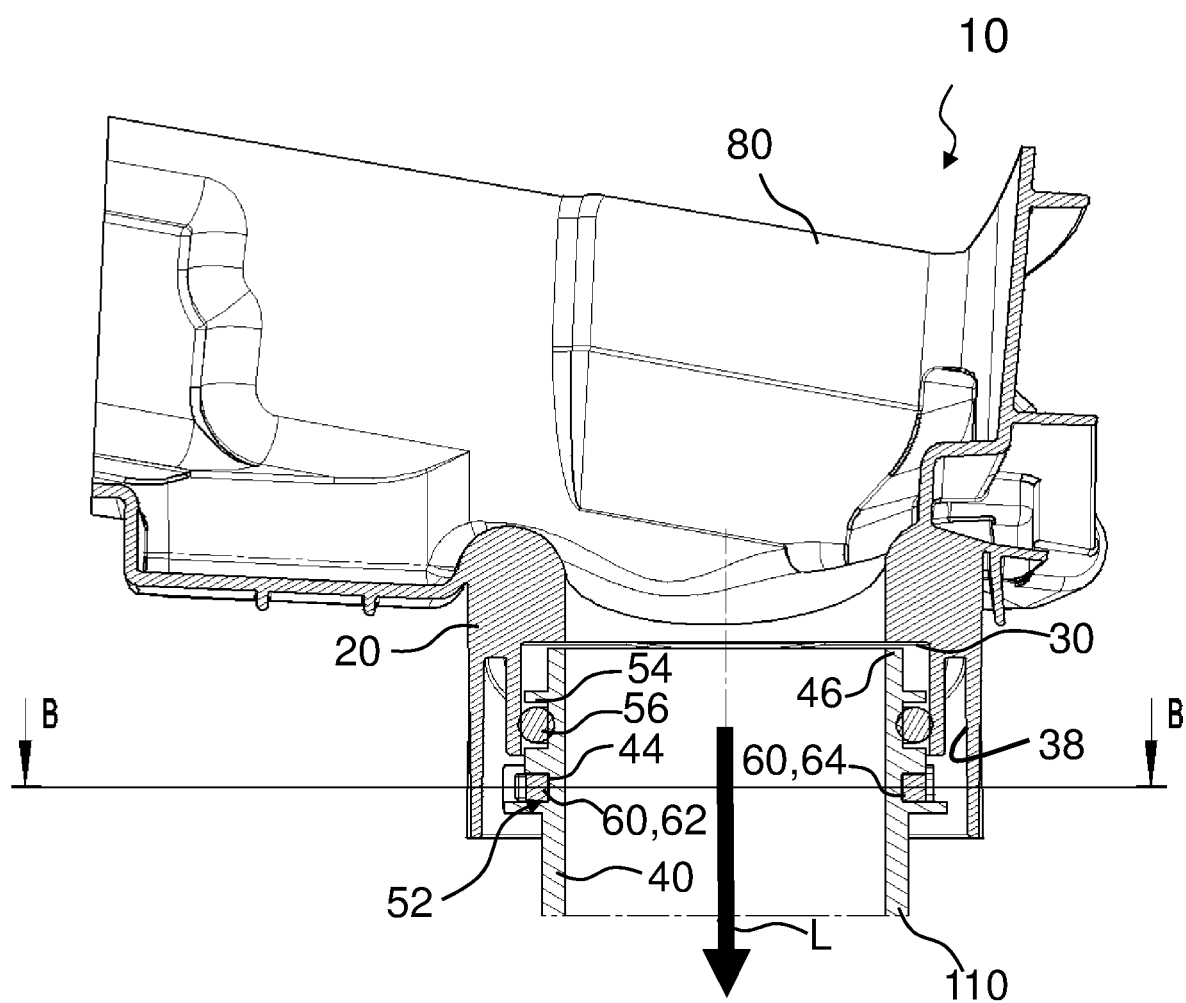
FIG. 3 shows a longitudinal section of the coupling device according to FIG. 1 in closed position.

FIG. 1 shows an isometric view of a coupling device 10 according to an embodiment of the invention while in FIG. 2 an isometric view of the outer coupling section 20 is illustrated. The coupling device 10 is arranged on the housing 80 of an air filter system that is illustrated partially. In FIG. 3, a corresponding longitudinal section of the coupling device 10 and in FIG. 4 a cross section of the coupling device 10 along the section line B-B according to FIG. 3 are illustrated.

The coupling device 10 which serves for quasi rigid connection of media-conducting lines, for example, of especially low-pressure and/or high-pressure associated lines 110 of an air intake system or media-conducting housings with connecting sockets and lines, comprises an outer coupling section 20 and an inner coupling section 40 as well as, for example, a locking element 60.

The outer coupling section 20 in FIG. 1 is illustrated as a component of a housing 80 that can be, for example, the housing of an air filter system. The outer coupling section 20 is illustrated in the form of a connecting socket. The inner coupling section 40 can be, for example, arranged at the end of an air-conducting pipe 110. The coupling device 10 can however be used also on other components which provide for a connection of fluid-conducting pipes.

The inner coupling section 40 is inserted with its free end into the outer coupling section 20 so that the coupling device 10 with the locking element 60 is illustrated in the closed state. The actuating elements 66, 68 for opening the locking element 60 project through the openings 22, 24 in the outer coupling section 20 in outward direction so that they are easily accessible and can be actuated without tool.

In FIG. 2, the two locking arc sections 62, 64 of the locking element 60 arranged on the outer coupling section 20 can be seen which extend in circumferential direction in the interior of the outer coupling section 20. The locking element 60 is connected by two connecting sections 72, 73 with the outer coupling section 20. The locking arc sections 62, 64 can be radially pivoted in outward direction by the actuating elements 66, 68 which project outwardly through openings 22, 24 through the outer coupling section 20. On their circumference, the locking arc sections 62, 64 comprise for reinforcement support regions 67, 69, 77, 79, in particular in the region of the actuating elements 66, 68, wherein the support regions 67, 69, 77, 79 also project through openings of the outer coupling section 20 outwardly in order to ensure the required freedom of movement upon pivoting of the locking arc sections 62, 64.

Figure 13:
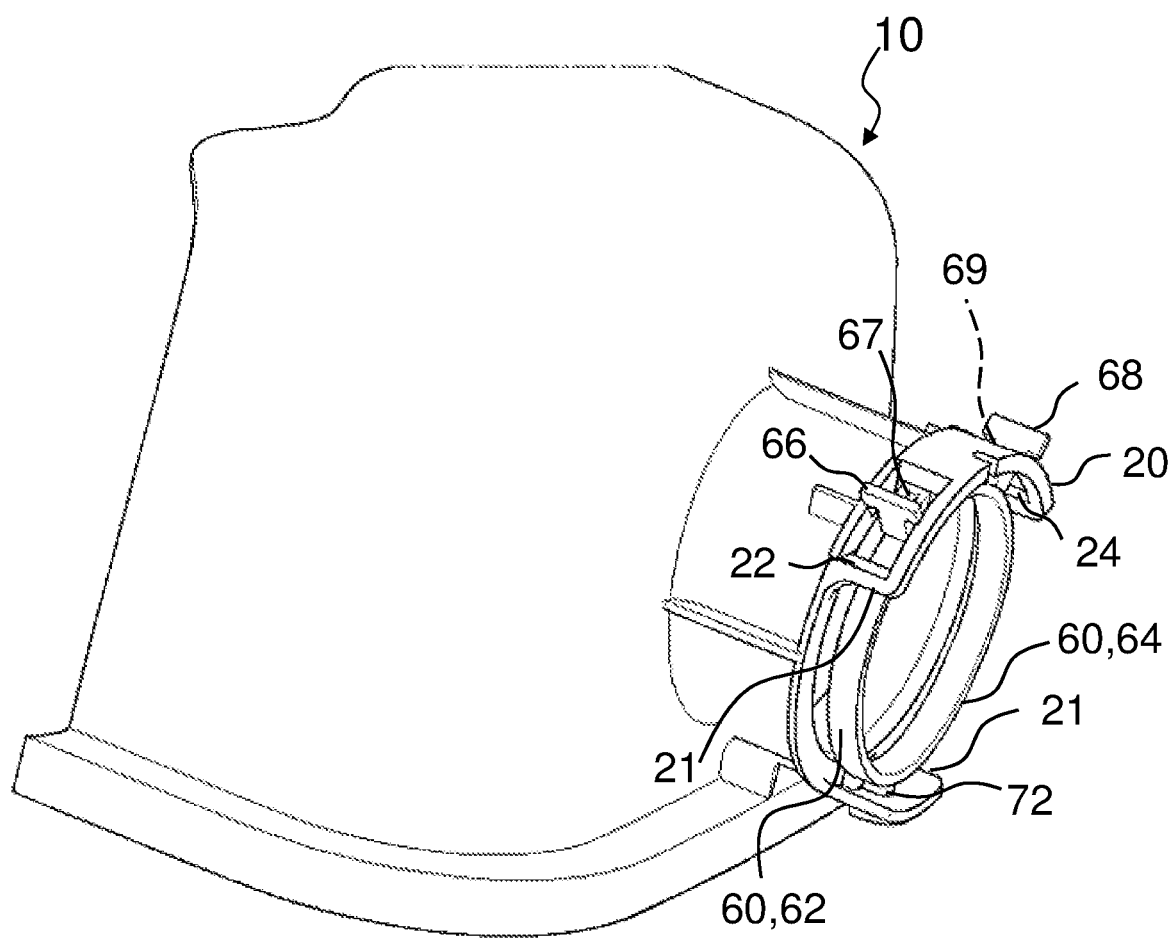
FIG. 13 shows an isometric view of a coupling section of a coupling device according to an embodiment of the invention.

In FIG. 3, it can be seen in longitudinal section of the closed coupling device 10 how the inner coupling section 40 is inserted into the outer coupling section 20 and the two locking arc sections 62, 64 of the locking element 60 arranged on the outer coupling section 20 can lock on the corresponding circumferentially extending locking section 52 of the inner coupling section 40 when the inner coupling section 40 is inserted so far into the outer coupling section 20 that a circumferentially extending stop 46 is resting against the open end 30 of a circumferential groove 38 of the outer coupling section 20. The illustrated circumferential groove 38 is advantageous because it covers completely the locking element 60 in outward direction and protects it in this way. Optionally, instead of the circumferential groove 38, it can however be provided to ensure only a sufficient stable connection to the coupling region of the coupling section in the area of the connecting sections and the support regions. This is illustrated in FIG. 13.

The locking section 52 is embodied as a circumferential, radial inwardly oriented shoulder 44, in the illustrated embodiment in the form of a groove, against the pull-out direction L of the coupling section 40 wherein the locking arc section 62, 64 in the properly mounted state is contacting the locking section 52 and is supported against the pull-out direction L. In this way, the inner coupling section 40 is secured against being pulled out of the outer coupling section 20 in pull-out direction L.

The coupling device 10 is sealed by means of a seal 56 inserted into a sealing groove 54, for example, an O-ring seal, which is contacting an inner wall of the outer coupling section 20.

Figure 4:
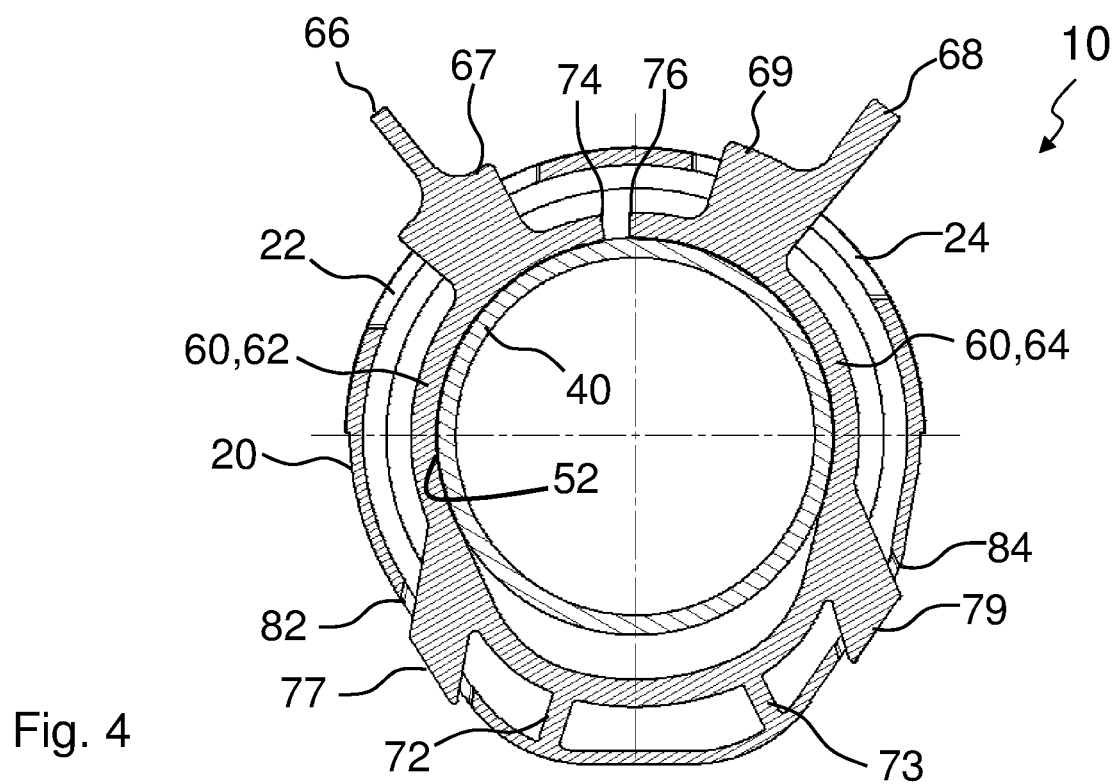
FIG. 4 shows a cross section of the coupling device according to FIG. 1 in closed position along the section line B-B in FIG. 3.

In the cross section illustrated in FIG. 4 of the coupling device 10 along the section line B-B according to FIG. 3, the embodiment of the locking element 60 can be seen in detail. The locking element 60 is fastened with two connecting sections 72, 73 to the outer coupling section 20 and extends in circumferential direction on both sides of the connecting sections 72, 73 with one locking arc section 62, 64 each between the two coupling sections 40, 20. The locking element 60 comprises locking arc section 62, 64 which are at least partially matched to the circumference of the coupling section 20. For proper mounting by insertion of the inner coupling section 40 into the outer coupling section 20, the locking element 60 is reversibly expandable in diameter by the inner coupling section 40 and interacts with the circumferentially extending locking section 52 in such a way that in the mounted state of the coupling sections 20, 40 an axial movement between the coupling sections 20, 40 is limited. For this purpose, the locking arc sections 62, 64 are contacting the circumferential shoulder 44 of the locking section 52.

Since the inner coupling section 40 is contacting with the stop 46 the free end 30 of the outer coupling section 20, the inner coupling section 40 is fixed by the locking arc sections 62, 64 contacting the shoulder 44 in the pull-out direction L. For opening the locking arc sections 62, 64, on the locking element 60 the actuating elements 66, 68 are provided which are arranged neighboring the free ends 74, 76 of the locking arc sections 62, 64. In addition, the actuating elements 66, 68 each have a support region 67, 69, 77, 79 in circumferential direction which stiffens the actuating element 66, 68 for applying greater forces onto the locking arc section 62, 64 and in particular provides a greater contact surface of the support region. Actuating elements 66, 68 and support regions 67, 69 project through the openings 22, 24 and the support regions 77, 79 through the openings 82, 84 in the outer rim of the outer coupling section 20 to the exterior so that the locking element 60 by pushing apart the actuating levers 66, 68 in circumferential direction, and thus the locking arc sections 62, 64, can be expanded. The locking arc sections 62, 64 are thus lifted off the shoulder 44 of the locking section 52 so that the inner coupling section 40 can be pulled out of the outer coupling section 20.

The locking element 60 is integrally formed with the connecting sections 72, 73 on the coupling section 20 and is produced as one piece together with it so that the coupling device 10 as a whole can be produced inexpensively. Alternatively, the locking element 60 can also be produced together with the coupling section 20 in an injection molding process, for example, in a two-component injection molding process. In this way, coupling section 20 and locking element 60 can be produced of different materials when, for example, the coupling section 20 is to have greater strength than the elastic and at the same time bending resistant locking element 60 that, for opening of the coupling device 10, is to be reversibly expandable.

Figure 5:
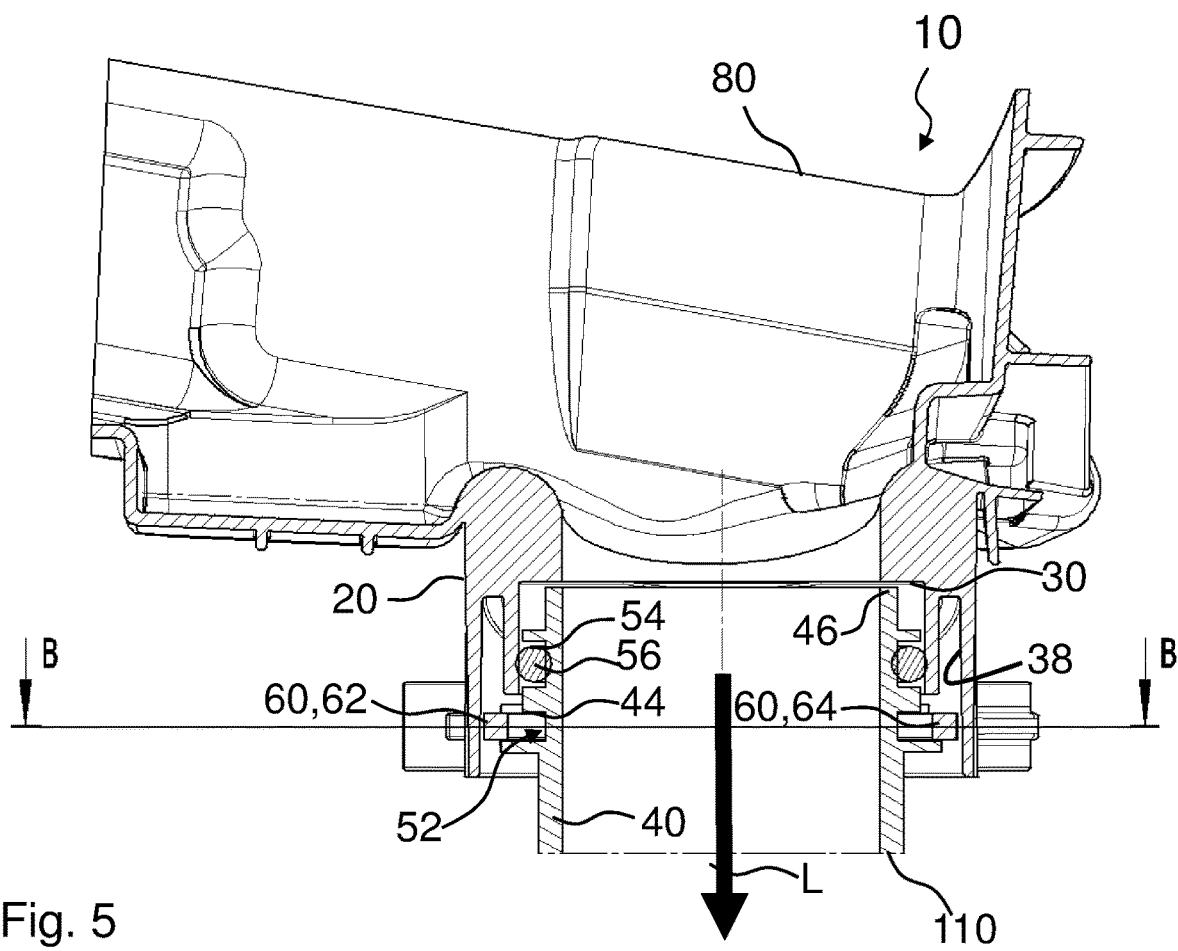
FIG. 5 shows a longitudinal section of the coupling device according to FIG. 1 in open position.
Figure 6:
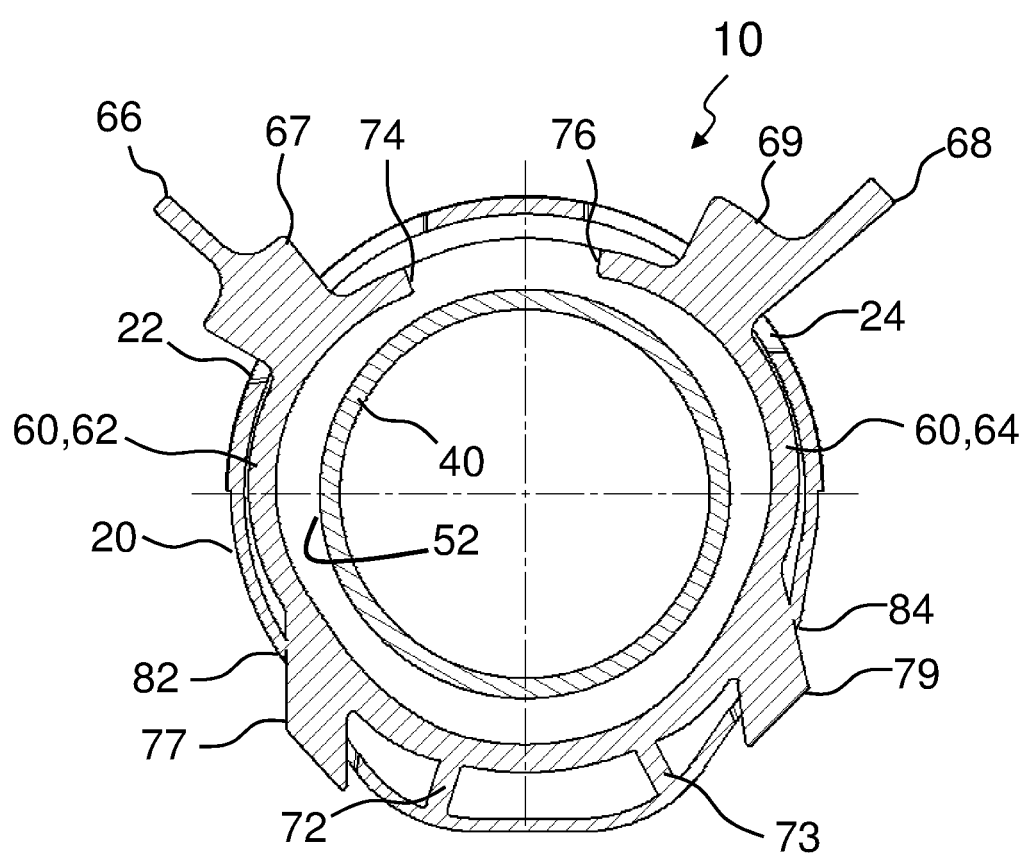
FIG. 6 shows a cross-section of the coupling device according to FIG. 1 in open position along the section line B-B in FIG. 5.

In FIGS. 5 and 6, the coupling device 10 is illustrated in open position in longitudinal section and cross section, respectively. In this position, the two locking arc sections 62, 64 can be released from the locking section 52. The two locking arc sections 62, 64 are pivoted outwardly in this context so that they lift off the shoulder 44 of the locking section 52. In this way, the inner coupling section 40 in pull-out direction L is no longer fixed and can thus be pulled out of the outer coupling section 20. In the illustrated embodiment, the locking arc sections 62, 64 in open position can be resting on an inner wall of the outer coupling section 20. Also, a lateral contact of the actuating elements 66, 68 on the coupling section 20 can be realized before a locking arc section 62, 64 contacts the inner wall. It is also possible that no inner wall is provided, as in the embodiment according to FIG. 13.

Figure 7:
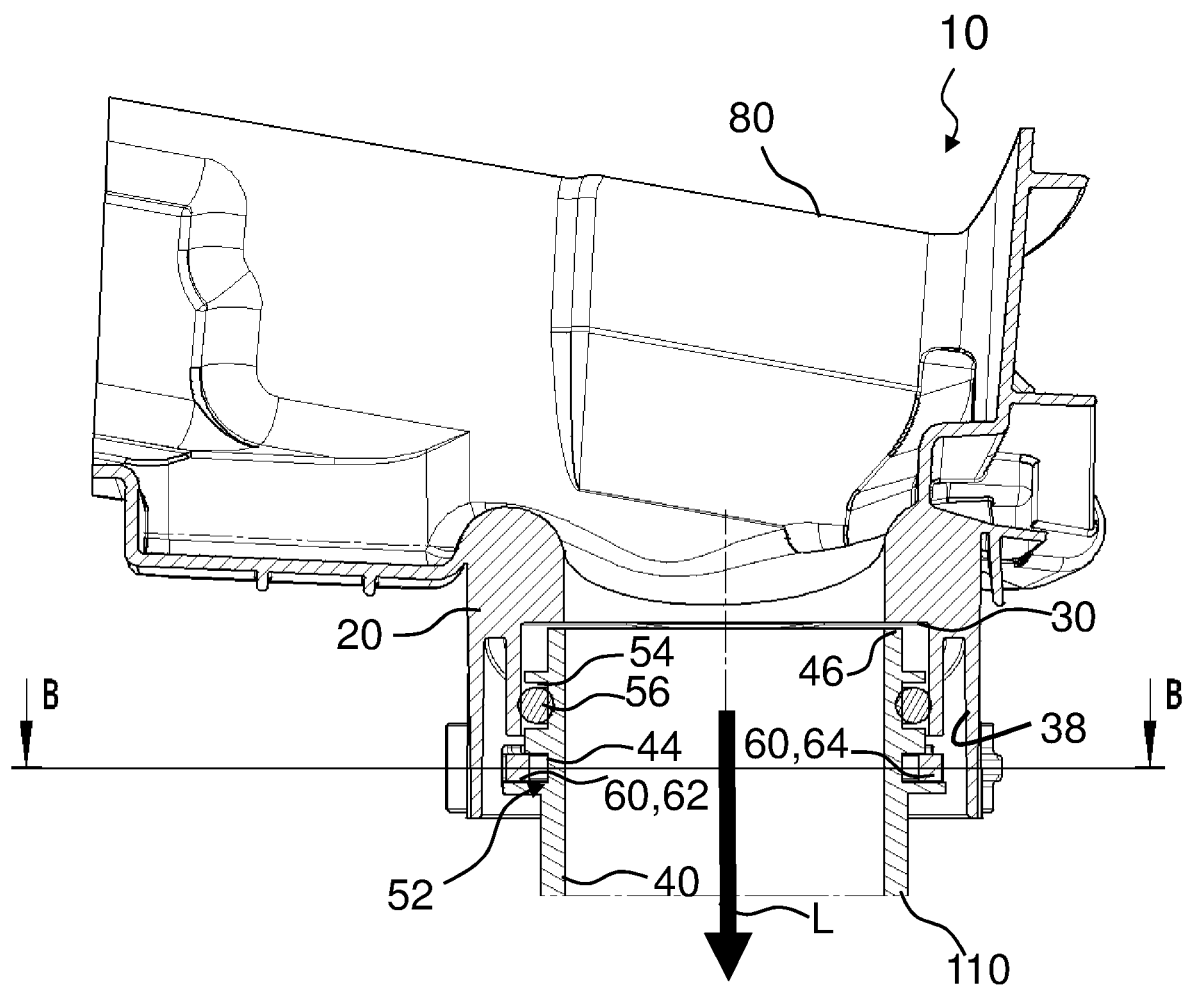
FIG. 7 shows a longitudinal section of the coupling device according to FIG. 1 in half open position.
Figure 8:
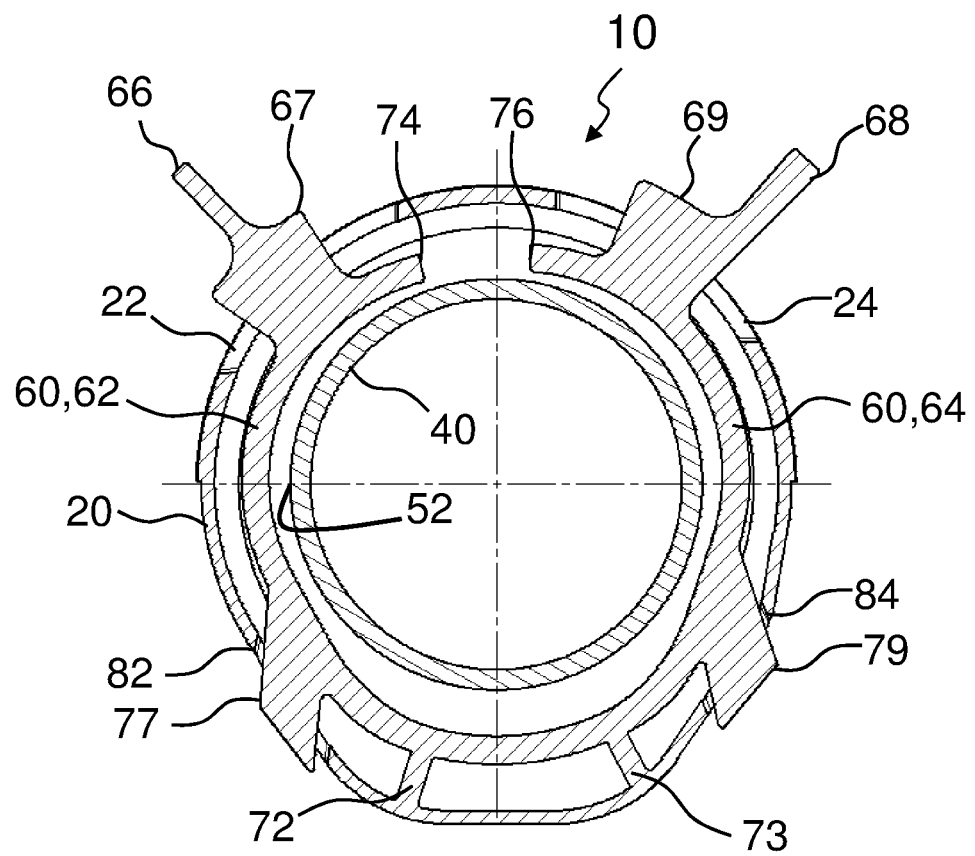
FIG. 8 shows a cross section of the coupling device according to FIG. 1 in half open position along the section line B-B in FIG. 7.

In FIGS. 7 and 8, the coupling device 10 is illustrated in half open position in longitudinal section and cross section, respectively. Here, the two locking arc sections 62, 64, pivoted outwardly, are shown in a position that is between the closed and the open position.

Figure 9:
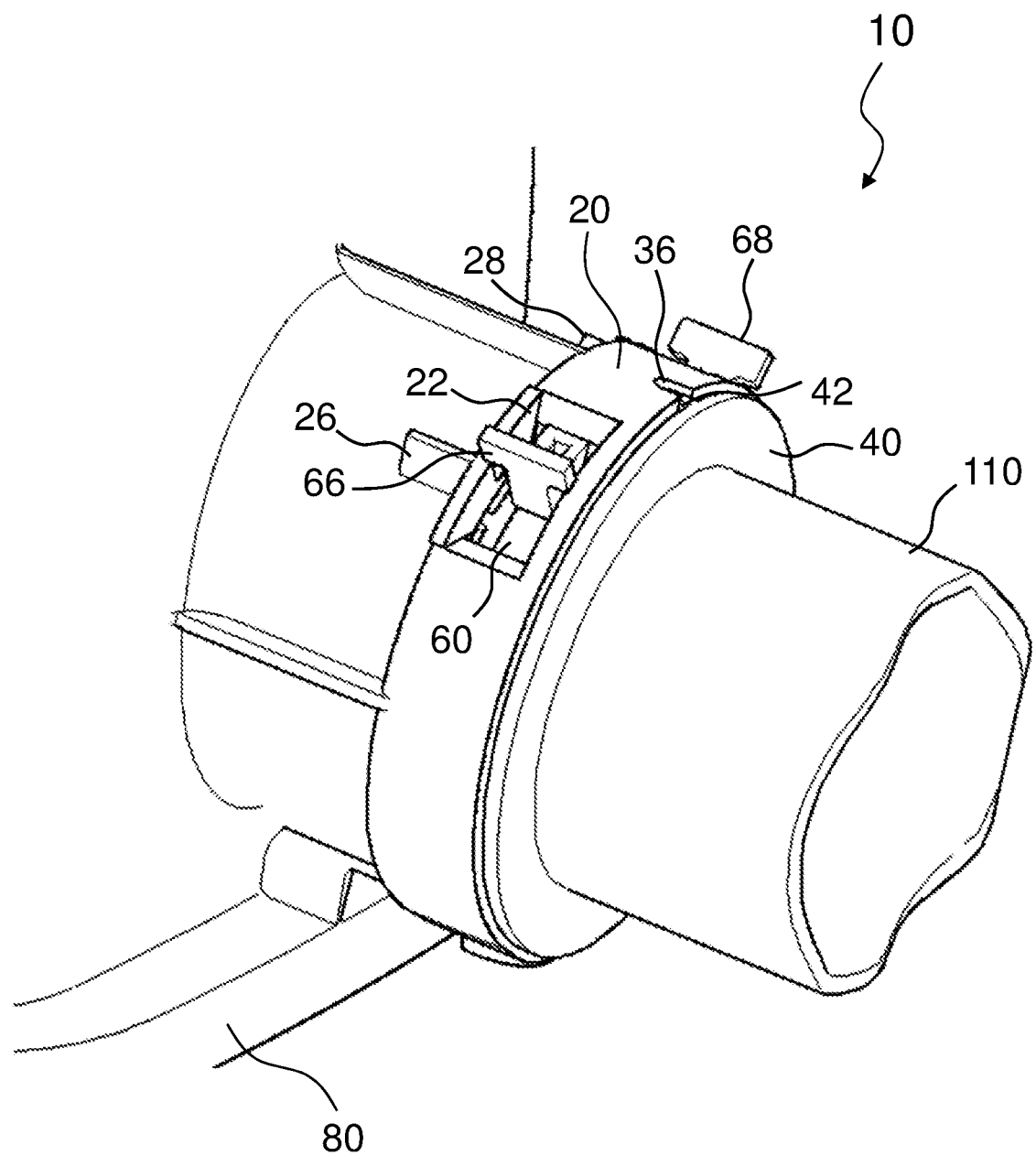
FIG. 9 shows an isometric view of a coupling device according to a further embodiment of the invention.
Figure 10:
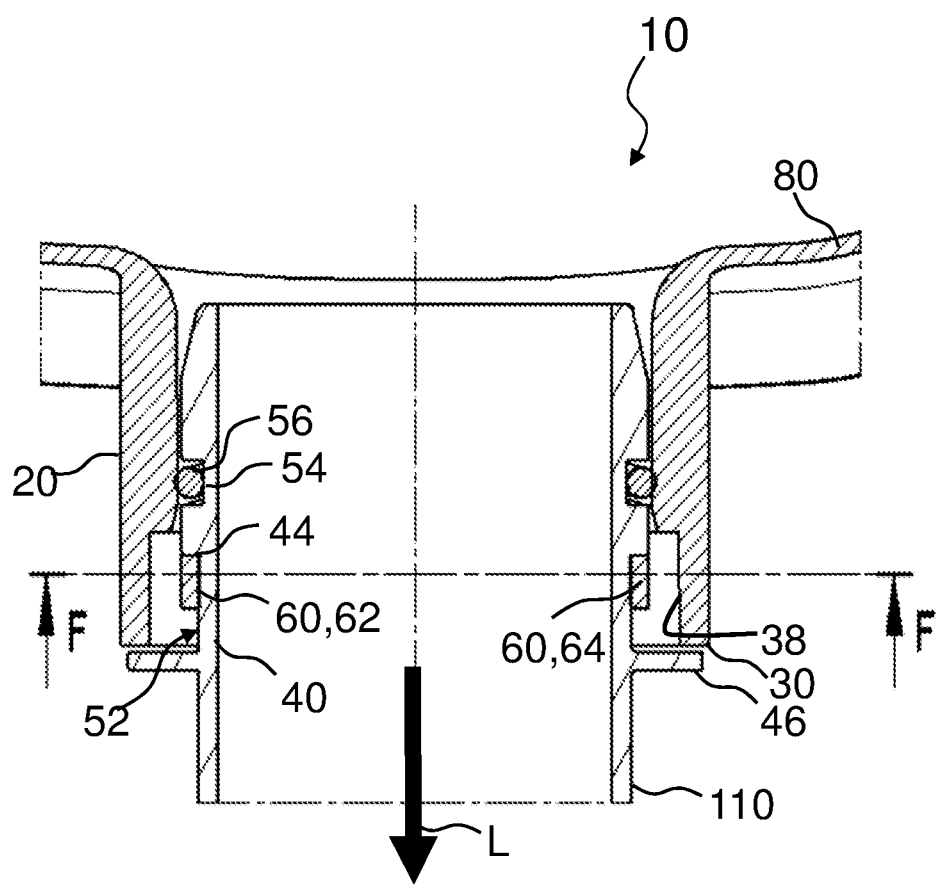
FIG. 10 shows a longitudinal section of the coupling device according to FIG. 9 in closed position.
Figure 11:
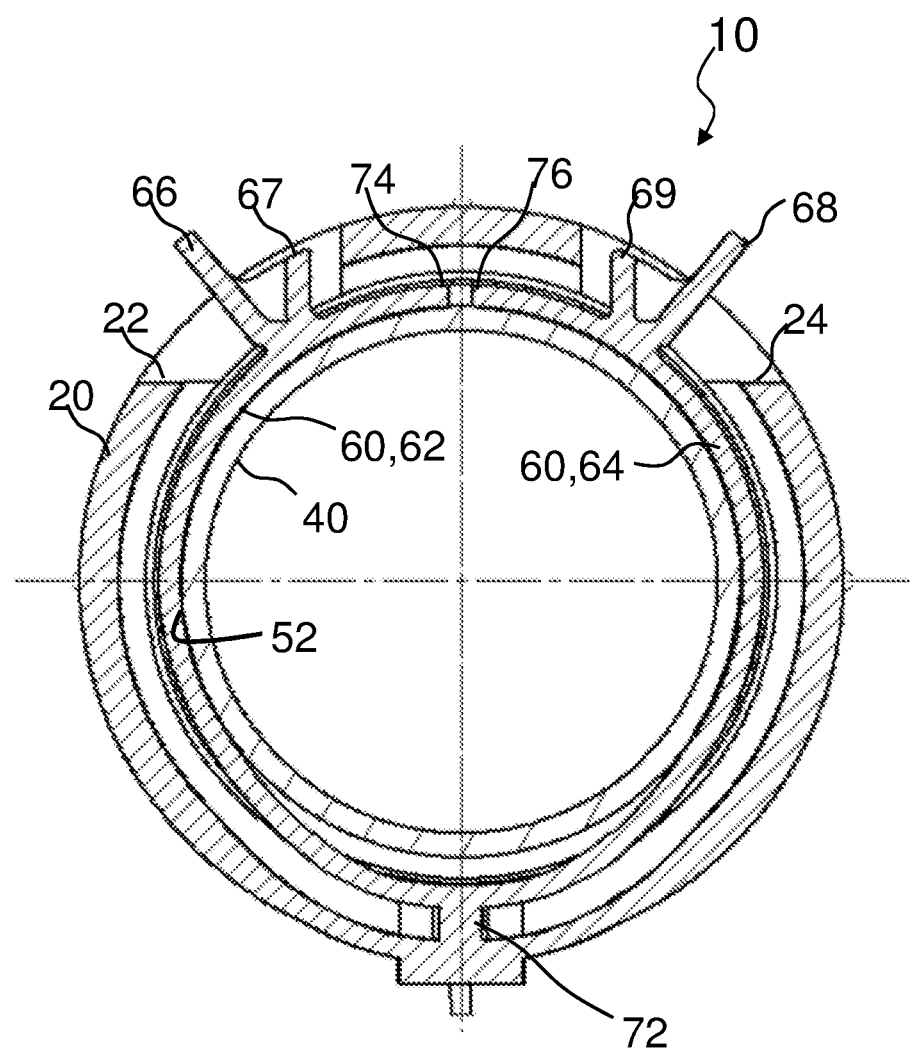
FIG. 11 shows a cross section of the coupling device according to FIG. 9 in closed position along the section line F-F of FIG. 10.

FIGS. 9 through 11 show a further embodiment of the coupling device 10. FIG. 9 shows in isometric illustration a coupling device 10 which is arranged on a housing 80 wherein an outer coupling section 20 is fixedly connected with the housing 80, for example, is embodied as one piece together with the housing 80. An inner coupling section 40 is inserted into the outer coupling section 20 and is locked by means of a locking element 60.

The coupling device 10 comprises marking devices 26, 28 for recognizing a position of the coupling device 10. In the locked, i.e., closed, state of the coupling device 10, the position of the actuating elements 66, 68 coincides with the markings 26, 28 provided on the outer coupling part 20 so that locking of the locking element 60 can be recognized from the exterior. Moreover, on the two coupling sections 20, 40 two orientation elements 36, 42 are provided by means of which the coupling sections 20, 40 can be mounted in correct position in an angular position relative to the longitudinal axis. One of the orientation elements 36 can be provided, for example, as a slit on the circumference of the outer coupling section 20 while the other orientation element 42 can be a nose on the circumference of the inner coupling section 40 which, upon insertion of the two coupling sections 20, 40, fit into each other and determine in this way an angular position relative to the longitudinal axis of the two coupling sections 20, 40 about the longitudinal axis upon insertion.

FIG. 10 shows a longitudinal section of the coupling device 10 according to FIG. 9. The locking section 52 of this embodiment is embodied wider in axial direction. The locking arc sections 62, 64 in the pull-out direction L are contacting only the shoulder 44 while the fixation of the inner coupling section 40 in opposite direction is realized by contact of the outwardly positioned stop 46 on the free end 30 of the outer coupling section 20.

FIG. 11 shows a cross section of the coupling device 10 according to FIG. 9 in closed position along the section line F-F in FIG. 10. As can be seen in cross section, a further difference of the coupling device 10 illustrated in FIGS. 9 through 11 resides in that the locking element 60 is connected by only one connecting section 72 with the outer coupling section 20. Also, the locking arc sections 62, 64 each have only one support region 67, 69 which is connected with the actuating elements 66, 68 and pivots outwardly through the openings 22, 24 upon pivoting of the locking arc sections 62, 64 in outward direction. The locking element 60 can exhibit greater elasticity because it is connected only by one connecting section 72 with the outer coupling section 20 so that it can be opened more easily and the inner coupling section 40 can thus be pulled out of the outer coupling section 20.

Figure 12:
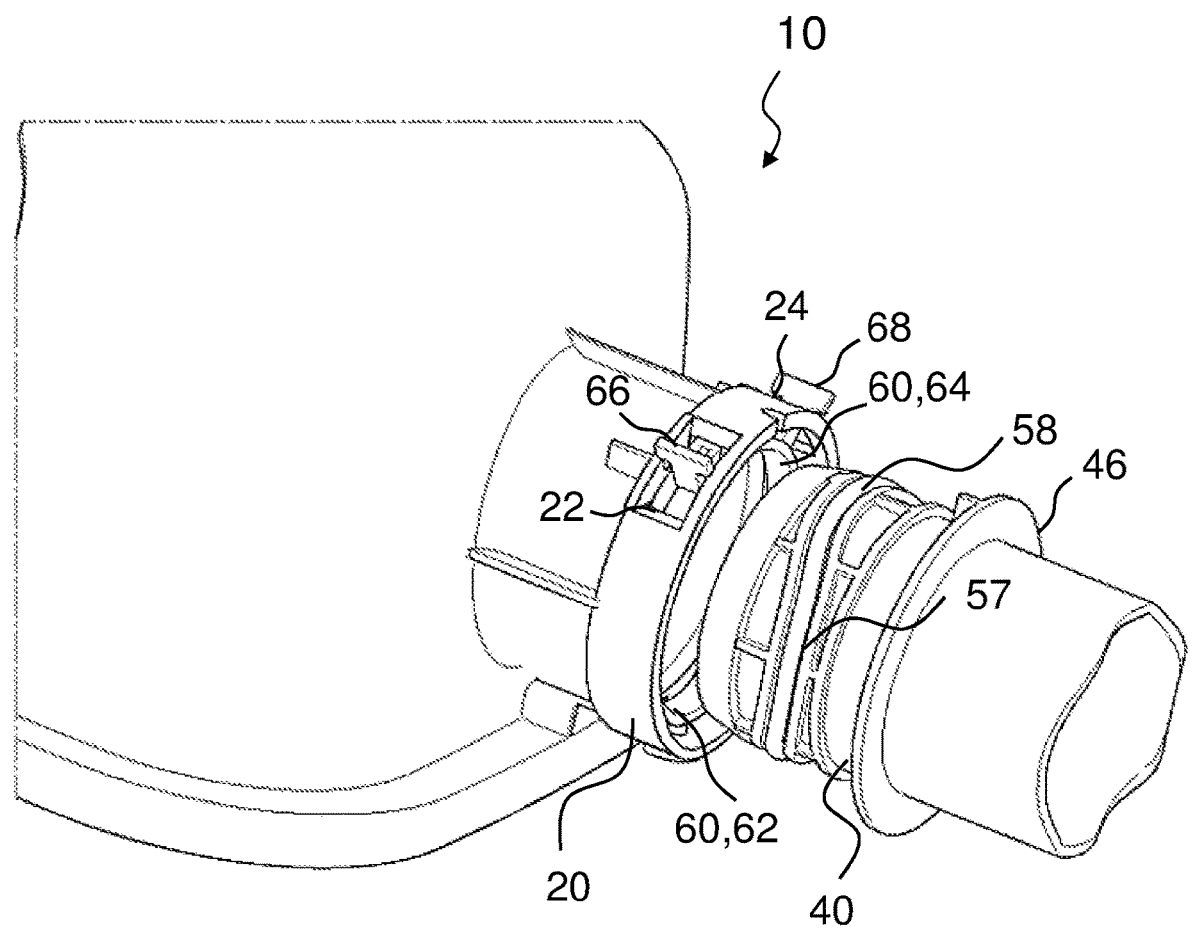
FIG. 12 shows an isometric view of a coupling device according to an embodiment of the invention with a sealing groove, on the circumference, extending at least partially in a corrugated shape in the assembly direction.

FIG. 12 shows in isometric illustration a coupling arrangement 10 with not yet connected coupling sections 20, 40 which, when the connection between the coupling sections 20, 40 is produced, corresponds from the exterior to that of FIG. 10. Instead of a simple round ring as seal 56, as in FIG. 3, on the inner coupling section 40 a corrugated groove 57 is provided with a seal 58 that, corresponding to the receiving geometry, has been brought into a corrugated shape. Since the sealing groove 57 for the seal 58 about the circumference of the coupling section 40 exhibits a corrugated shape at least partially in assembly direction, in particular in assembly direction, the mounting force to be applied for closing the coupling arrangement can be advantageously reduced.

FIG. 13 shows a variant of the outer coupling section 20 in FIG. 3. Instead of a circumferential groove 38 as in FIG. 3, in this embodiment it is provided, for example, that only in the area of the connecting section 72 of the locking element 60 and in the area of the respective support regions 67, 69 which are arranged adjacent to the actuating elements 66, 68 at the free ends of the locking arc sections 62, 64, a stable connection to the outer wall of the coupling section 20 is provided. The outer wall of the outer coupling section 20 is provided with two cutouts 21 between the support regions and the connecting section 72, respectively.

While specific embodiments of the invention have been shown and described in detail to illustrate the inventive principles, it will be understood that the invention may be embodied otherwise without departing from such principles.

What is claimed is:

1. A coupling device for connecting media-conducting lines, the coupling device comprising:
   a one-part or multi-part radially outer coupling section;
   a one-part or multi-part radially inner coupling section, comprising:
      a circumferential locking section formed on a radially outer wall of the radially inner coupling section and extending at least partially around a circumference of the radially inner coupling section;
   wherein the radially outer coupling section comprises:
      a circumferentially outer wall circumferential arranged about a radially outer side of the radially inner coupling section;
      at least one locking element arranged in a radial interior of the circumferential outer wall of the radially outer coupling section, wherein the circumferential outer wall and the at least one locking element are integrally formed in one piece, wherein the at least one locking element comprises:
         one or more locking arc sections extending in a circumferential direction radially between the circumferential outer wall and the radially inner coupling section;
         at least one connecting fastening section projecting radially outwardly from the one or more locking arc sections and connected onto a radially inner surface of the circumferential outer wall of the radially outer coupling section, fixedly fastening the one or more locking arc sections onto the radially inner surface of the circumferential outer wall;
      wherein the one or more locking arc sections engages with the circumferential locking section of the radially inner coupling section;
      wherein, when the radially inner coupling section is inserted into the radially outer coupling section, the radially outer coupling section is arranged only radially outside of the radially inner coupling section;
   wherein the radially outer coupling section further comprises:
      a circumferential inner wall spaced radially inwardly from the circumferential outer wall of the radially outer coupling section, the spacing forming a circumferential groove between the circumferential inner wall and the circumferential outer wall;

wherein the radially outer wall of the radially inner coupling section includes a circumferential sealing groove, and has a seal ring arranged in the circumferential sealing groove;

wherein the seal ring seals against the circumferential inner wall of the radially outer coupling section.

2. The coupling device according to claim 1, further comprising at least one actuating element provided on the at least one locking element for opening the one or more locking arc sections;

wherein the at least one actuating element is formed on and projects radially outwardly from a radially outer surface of the one or more locking arc sections;

wherein the at least one actuating element projects through an opening of the radially outer coupling section to an exterior of the radially outer coupling section.

3. The coupling device according to claim 2, wherein the at least one actuating element is arranged adjacent to a free end of the one or more locking arc sections.

4. The coupling device according to claim 1, wherein the at least one locking element is reversibly expandable in diameter relative to the circumferential locking section of the radially inner coupling section to lock and unlock the coupling device for proper mounting.

5. The coupling device according to claim 1, wherein the one or more locking arc sections comprise at least one support region extending in the circumferential direction.

6. The coupling device according to claim 1, wherein the circumferential locking section of the radially inner coupling section is a circumferential, radial inwardly oriented shoulder facing in a pull-out direction of pulling out the inner coupling section from the outer coupling section, wherein the one or more locking arc sections in a properly mounted state of the coupling device are contacting against the circumferential locking section and are supported on the circumferential, radial inwardly oriented shoulder against the pull-out direction.

\* \* \* \* \*